United States Patent [19]
Torrado

[11] Patent Number: 5,094,734
[45] Date of Patent: Mar. 10, 1992

[54] WATER TREATMENT UNIT

[76] Inventor: Santiago D. Torrado, Maldonado, 48, Madrid, Spain, 28006

[21] Appl. No.: 388,838

[22] Filed: Aug. 3, 1989

[51] Int. Cl.[5] .............................................. G25B 9/00
[52] U.S. Cl. .................................... 204/234; 204/272; 204/274; 204/275; 204/278; 204/262; 204/263; 204/266; 204/294; 204/128; 204/129; 204/101; 204/149; 210/198.1; 210/754; 210/760
[58] Field of Search ............... 204/234, 239, 242, 272, 204/273, 274, 275, 278, 294, 128, 129, 101, 149, 262, 263, 266; 210/198.1, 754, 760

[56] References Cited

U.S. PATENT DOCUMENTS 3,282,823  11/1966  Richards .................... 204/272
4,171,256  10/1979  Themy ...................... 204/128
4,256,552  3/1981   Sweeney .................... 210/754
4,361,471  11/1982  Kosarek .................... 204/149

Primary Examiner—John Niebling
Assistant Examiner—Kathryn Gorgos
Attorney, Agent, or Firm—Wenderoth, Lind & Ponack

[57] ABSTRACT

A water treatment unit uses an electrolytic cell generating chlorine and ozone. The electrolyte is brine, and the separation between the anode and the cathode of the cell is 2-30 cm. The generated chlorine and ozone are added to a stream of water to be treated, with the interposition of a turbulence promoting arrangement. The unit operation is automatically regulated from the working times of the cell and volume of water to be treated, and/or electrometrical probes as chlorine detectors.

16 Claims, 1 Drawing Sheet

WATER TREATMENT UNIT

BACKGROUND OF THE INVENTION

The invention referes to a water treatment unit using an electrolytic cell generating chlorine and ozone in order to reduce the number of living organisms existing in water, usable in portabilizing units, even portable ones, swimming pools, sanitary industries and, in general, where this operation may be required.

The electrolytic obtention of chlorine from brine is usually carried out in special cells well known in the electrochemical industry, wherein a constant distance of 0.3 cm, or less, is generally employed between anode and cathode, which are separated by a diaphragm a membrane of a pattern of selective ionic interchange, using materials of the platinum group for the electrodes.

Actually, portable water treatments begin with the addition of chlorine and/or ozone, within the permitted limits, in order to act on the chemistry of water, for example oxidation of some metals, as ferrous salts, or on metalloid combinations, for example oxidation of sulphides, with the scope of improving the chemical and organoleptic properties of water. Afterwards, in another phase of the treatment, chlorine and/or ozone are again added in order to produce disinfectant effects to control water flora. With this process there is frequently used, as a source of chlorine, hypochlorite solutions or chlorine gas, and ozonizing devices to add the ozone.

U.S. Pat. No. 3,767,557 describes an electrolytic cell that supplies chlorine gas for water treatment of swimming pools, without requiring a constant surveillance.

U.S. Pat. No. 3,945,905 describes an anode assembled on a shaft rotating around a cathode as an external cylinder, and at the same time is provided with brushes which clean the surface of the cathode, thus improving the production of chlorine.

SUMMARY OF THE INVENTION

The unit of the invention differs in seeking mixtures of chlorine and ozone, at least in a ratio of ozone and chlorine between about 2-25 per 100, which is obtained when the known electrolytic cell conditions are altered, such as a greater separation between anode and cathode, for example about 2-20 cm, and also by using less selective membranes or diaphragms, and less expensive materials for the electrodes, providing an electric charge density that promotes ozone production. The brine employed does not require a special purity degree nor a high degree of concentration.

The mixture of gases of chlorine and ozone acts in a synergical mode, both on the chemistry of water and on the microbial flora and other existing germs, being the main application of the unit of the invention in the disinfection of potable waters, where ozone, as it acts swiftly, reduces the time of exposition of water, thus allowing chlorination as water flows, or a reduction of the concentrations of chlorine employed. Furthermore, ozone improves the organoleptic properties of water (reducing turbidness, improving odor and taste). The nascent chlorine, with a greater reaction power because of its energy of activation, resembles ozone in its action. For these reasons, water treated with these two products has better properties than those treated with the known systems using hypochlorite solutions or chlorine gas.

A first object of the invention refers to a water treatment unit basically constituted by an electrolytic cell fed with brine in order to produce chlorine, which is then added to a water stream or into a storage tank, the unit also comprising:

An electrolyte cell in which the separation between the anode and the cathode ranges about 2-20 cm, the cell being fed with brine and producing gases of chlorine and ozone in a ratio ozone/chlorine ranging about 2-25 per 100;

A cathode for the electrolytic cell, constituted by a metallic cylinder;

An anode for the electrolytic cell constituted by at least a bar of graphite located in the central zone of the cylindrical cathode;

A closed circuit arrangement for a forced flow of water in which the chlorine and ozone producd by the cell are mixed and partially dissolved, the closed circuit arrangement being fed with water, previously treated by the unit, coming from the storage tank;

A cooling device for the electrolytic cell fed with water previously treated by the unit and coming from the storage tank, and A turbulence promoting arrangement enclosed in to closed circuit arrangement and located after the point of incorporation of chlorine and ozone gases into the forced flow of water.

In an alternative embodiment of the water treatment unit of the present invention, the graphite bars constituting the anode of the electrolytic cell are placed around the metallic cylinder constituting the cathode of the cell.

According to the invention, the closed circuit arrangement is connected to the main supply of water to be treated by the unit, the water entering the storage tank at its upper end.

Furthermore, in the water treatment unit of the invention, the closed circuit arrangement is also connected to the storage tank at its lower end.

Other advantages of the unit of the invention are its lower cost of operation and settling when compared with similar units actually in use. The unit is more secure and has a fewer number of controls, because the unit includes automatic regulation of residual chlorine levels the use of simple systems such as meters to monitor flow and/or working times, or isolated or integrated detectors of physico-chemical or chemical parameters, such as pH, redox, chlorine, ozone, etc, avoiding both hypochlorination and hyperchlorination of treated water.

One of the objects of the unit of the present invention is to provide disposability with chlorine added of different ratios of ozone, according to each type of water to be treated. Also a regulating means may be varied when a higher control of chlorine and ozone will be required.

The operation of the unit is based on the electrolysis of alkaline chlorides, usually common salt, which mainly produces chlorine, which is used, and hydrogen and soda, that generally are discarded in small arrangements. A secondary reaction in the cell produces ozone.

The feeding of brine to the electrolytic cell from preparation tanks, for example in concentrations of about 2-30%, is made by a pump commanded by electrovalves that regulate the gas feeding according to the operating time of the cell. Also, it would be possible to use liquid electrolytes, even as diluted as sea water.

The generated chlorine and ozone gases are collected at the top of the electrolytic cell, and are aspirated by a water stream of injected in to an water inlet of a storage tank. The chlorine acts as a solvent for ozone, but the unit may have a tubulenece promoting arrangement in order that any ozone not dissolved in chlorine may be dissolve in the water.

Hydrogen is recovered from the cell, or allowed to escape, duly isolated from other gases, or even mixed with air when required.

The soda generated is removed after one or more operating cycles by drainage, improving the scaling characteristics of the metallic pieces in the electrolytic cell. The feed of new brine also washes the metallic pieces.

The electrolytic cell includes a metallic cylinder, i.e. iron, that acts as cathode, while as an anode, one or more bars of graphite impregnated with protecting resins is employed, preferably located in the central zone of cylinder. The separation between catholyte and anolyte is obtained by a diaphragm or membrane, that may be made of several known materials which allow the transit of sodium ions, and preferably stop chlorine ions. Among these materials are conglomerated asbestos or other silicates. Fluorocarbon membranes or other special membranes that have on their surface ionic exchange power might be employed. These materials are supplied in sheets of required porosity which may be inserted in a plastic base, as polyethylene, PVC, etc. The surface and type of the membranes have important effects on the yield and electric resistance of the cell.

The whole cell is preferably placed inside a plastic, i.e. PVC, coating, housing or vessel.

The electric power (D.C.) supplied to the electrolytic cell ranges between 4–30 V, depending on the type of diaphragm or membrane employed. The electric intensity is between about 5–150 A, and it varies according to the type of electrolytic cell employed.

The electrolytic cell can be provided with a cooling device suitable for the location and working conditions of the cell. The cooling device may be a PVC coil arrangement at the inner surface of the diaphragm or membrane. The cooling device might be placed in other sites also, e.g. around the cathode.

The regulation of the operation of the unit could be achieved either by acting on the working conditions of the cell or by the levels of chlorine and/or ozone produced. Examples of the first mode are measurements of the temperature of the cell, amounts of electrolyte or electricity consumed, time of operation, etc. Examples of the second mode could be the measure of the chlorination degree of treated water, flow rate or level of water in the storage tank, pH, redox, etc.

The unit also produces soda (sodium hydroxide) that could be used in the regulation of pH in the water treated or for a general use in industry.

Another byproduct of the cell is hydrogen of a high purity (99%), which can be used to heat and supply hot water at location of the unit, it could be collected by metallic sponges or other systems.

Also, the unit of invention could be employed to produce chlorine and its derivatives, such as hypochlorite, for general use in industry.

BRIEF DESCRIPTION OF THE DRAWING

The water treatment unit of the invention will be better understood from the following description of an embodiment, represented by way of example only in the accompanying FIG. 1, in which is schematically illustrated an embodiment of the water treatment unit.

DESCRIPTION OF THE PREFERRED EMBODIMENT

Figure 1:
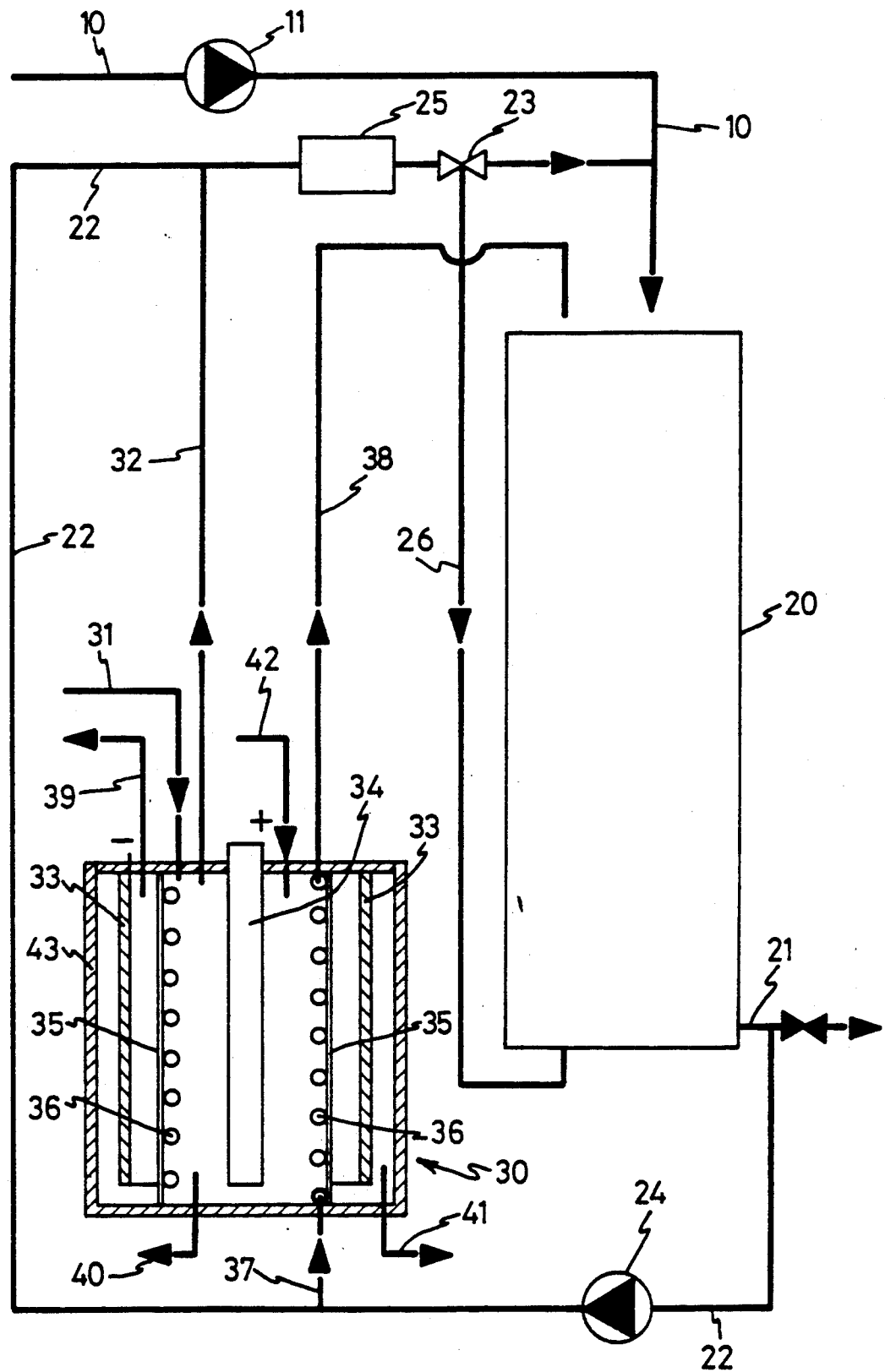

In FIG. 1, it an example of an embodiment of the water treatment unit of the present invention is represented schematically.

As shown, the supply of water to be treated flows by a pipe (10) impelled by a pump or group of pumps (11). Water is drawn to a storage tank (20) and from there, after the treatment, can be withdrawn by pipe (21) for consumption or connection to a distribution line.

An electrolytic cell (30) generates, from brine fed through inlet conduit (31), chlorine and ozone gases that flow thorugh outlet pipe (32) connected to a pipe (22) supplied with water from storage tank outlet (21) and which ends in the water supply inlet (10). The gases, chlorine and ozone, are disolved and driven by the water circulating in pipe (22), and the mixture of water and gases is discharged into the storage tank (20), either by pipe (10) on the upper part of tank (20) or in the lower part of the tank through pipe (26), depending on the operating requirements of each particular case, the selection between both inlets (10,26) of storage tank (20) being carried out by command of a direction valve (23).

The electrolytic cell (30) has a cathode (33), constituted by a cylindrical piece of iron or other conductive metal, and an anode (34) made of one or more bars of graphite, covered by suitable protecting resins. Anode bars (34) are placed in the central zone of cylindrical cathode (33) with a separation between about 2 and 20 cm.

There is a membrane or diaphragm (35) between anode (34) and cathode (33) having the a porosity suitable to make a selection between anions and cations during the electrolytic reactions. Over the inner cylindric wall formed by membrane (35), there is a coil arrangement (36) forming a cooling device for the cell (30), which is fed with water circulating in pipe (22) through connecting pipe (37). Hot water leaves cooling system (36) by a pipe (38) and returns to storage tank (20).

Brine enters through upper part of the cell (30) by conduit (31) connected to suitable preparation tanks (not shown), and the gases of chlorine and ozone obtained in the anode zone leave the cell by pipe (32) while hydrogen produced in the cathode zone leaves the cell by a pipe (39). Exhausted anolytes and catholytes are extracted by conduits (40, 41) in the lower end of cell (30). An air inlet (42) in the upper part of cell (30) improves the conditions to produce ozone. Electrolytic cell (30) is a coat, in a coat, housing or vessel (43) made of plastic.

As mentioned above chlorine and ozone gases have a synergic effect in the depuration of water; while chlorine also facilitates ozone solubility in water, and for these reasons the water treatment unit of the present invention comprises a closed circuit arrangement substantially formed by pipe (22), so that chlorine and ozone gases can be re-added to the water under treatment. These gases are mixed and partially dissolved in the water stream of pipe (22) driven by the suction effect of the flow in the pipe impelled by a pump (24), which also forces circulation of water in the cooling device (36). To increase the dissolution of ozone in water, there has been provided in pipe (22), after the connection with pipe (32), a turbulence promoting device (25) formed with fins, blades, etc., or having ultrasonic power.

From the above description of an exemplary embodiment of the invention, it can be readily understood that a water treatment unit of the invention it can be incorporated into water treatment plants already in operation. Also, it will be easily understood that by simply increasing the number of electrolytic cells, as well as its portable characteristics, the purifying ability increases, thus amplifying its field of applications.

I claim:

1. A water treatment unit, comprising:
   an electrolytic cell means for producing chlorine and ozone gases from brine in an ozone/chlorine ratio of approximately 2-25 per 100, said electrolytic cell mean having an anode and a cathode, said anode and cathode being separated approximately 2-20 cm;
   said cathode comprising a metallic cylinder;
   said anode comprising at least one bar of graphite disposed centrally inside said cathode comprising a metallic cylinder;
   a storage tank for containing a batch of water to be purified;
   closed circuit means for forcing water to flow which has already been purified in said storage tank from said storage tank, means for combining, mixing and partially dissolving chloride and ozone gases from said electrolytic cell means with the water which has already been purified is connected to said closed circuit means and returning the water with the chlorine and ozone mixed and partially dissolved therein to said storage tank by the closed circuit means and wherein said closed circuit means does not have means for feeding water from said storage tank into said electrolytic cell means for electrolysis;
   cooling means located within said electrolytic cell means for cooling said electrolytic cell means, said cooling means using water to cool said electrolytic cell means; and
   turbulence promoting means in said closed circuit means for promoting turbulence of the water therein after the water has the chlorine and ozone combined therewith.

2. The water treatment unit as set forth in claim 1, wherein:
   said at least one bar of graphite comprises a plurality of graphite bars disposed in said metallic cylinder of said cathode.

3. The water treatment unit set forth in claim 1, wherein:
   an inlet conduit is provided for feeding a batch of water to be purified to said storage tank; and
   said closed circuit means comprises a conduit connected to said inlet conduit for delivering the water combined with the chlorine and the ozone to said storage tank.

4. The water treatment unit as set forth in claim 3, wherein:
   said conduit of said closed circuit means is also connected to a lower end of said storage tank for receiving the water which has already been purified from said storage tank.

5. The water treatment unit as set forth in claim 1, wherein said electrolytic cell means further comprises:
   a housing having said cathode and said anode therein; and
   a porous membrane in said housing disposed between said cathode and said anode.

6. The water treatment unit as set forth in claim 5, wherein:
   said cooling means comprises a conduit for carrying the water for cooling said electrolytic cell means, said conduit being disposed inside said housing adjacent said porous membrane.

7. The water treatment unit as set forth in claim 5, and further comprising:
   a first pipe connected to said housing said electrolytic cell means for removing hydrogen therefrom; and
   second and third pipes connected to said housing of said electrolytic cell means for removing anolytes and catholytes therefrom.

8. The water treatment unit as set forth in claim 5, and further comprising:
   a brine feed pipe and an air inlet pipe connected to said housing of said electrolytic cell means.

9. The water treatment unit as set forth in claim 1, wherein:
   said closed circuit means comprises a conduit connected at one end thereof with said storage tank for receiving the water which has already been purified therein, said conduit being further connected at another end thereof with said storage tank for delivering the water combined with the chlorine and the ozone to said storage tank; and
   said electrolytic cell means has a chlorine and ozone conduit between said cell and said conduit of said closed circuit means for delivering chlorine and ozone to said conduit of said closed circuit means.

10. The water treatment unit as set forth in claim 9, wherein:
    said another end of said conduit of said closed circuit means has two conduit portions, one said conduit portion being connected to the lower end of said storage tank, and the other said conduit portion being connected with the upper end of said storage tank.

11. The water treatment unit as set forth in claim 10, wherein:
    said turbulence promoting means in said closed circuit means is between said conduit portions and the point whereat said conduit of said closed circuit means received the chlorine and ozone from said chlorine and ozone conduit.

12. A water treatment unit, comprising:
    an electrolytic cell means for producing chlorine and ozone gases from brine in an ozone/chlorine ratio of approximately 2-25 per 100, said electrolytic cell means having an anode and a cathode, said anode and cathode being separated approximately 2-20 cm;
    said cathode comprising a metallic cylinder;
    said anode comprising at least one bar of graphite disposed centrally inside said cathode comprising a metallic cylinder;
    a storage tank for containing a batch of water to be purified;
    an inlet feed pipe connected to said storage tank for feeding water to be purified to said storage tank;
    a storage tank outlet for delivering purified water from said storage tank;
    a water circulating pipe connected at one end to said storage tank outlet and at the other end to said inlet feed pipe for feeding water back into said storage tank wherein said water circulating pipe does not have means for feeding water from said storage tank into said electrolytic cell means for electrolysis;

a gas outlet pipe means connected at one end to said electrolytic cell means and at the other end to said water circulating pipe for delivering chlorine and ozone gases from said electrolytic cell means to said water circulating pipe at a first position between said ends of said water circulating pipe;

cooling means for cooling said electrolytic cell means, said cooling means comprising a cooling pipe connected to said water circulating pipe at a second position between said first position and said one end, said cooling pipe extending from said water circulating pipe, through said electrolytic cell means and to said storage tank for circulation of cooling water from said storage tank; and turbulence promoting means in said water circulating pipe for promoting turbulence of the water therein to increase the dissolution of ozone in the water, said turbulence promoting means being located at a third position along said water circulating pipe between said first position and said other end.

13. The water treatment unit of claim 12, wherein said electrolytic cell means has a porous membrane between said cathode and said anode, and said cooling pipe extends between said anode and said cathode adjacent said porous membrane.

14. The water treatment unit of claim 13, wherein said porous membrane is cylindrical and said cooling pipe extends inside said porous membrane.

15. The water treatment unit of claim 12, wherein a valve is disposed in said water circulating pipe between said third position and said other end, an alternative pipe being connected between said storage tank and said valve, wherein water in said circulating pipe can be returned to said storage tank either through said inlet feed pipe or said alternative pipe.

16. The water treatment unit of claim 12, wherein said electrolytic cell means comprises a housing for said anode and said cathode, a cylindrical porous membrane between said anode and said cathode, an exhausted anolyte conduit extending from between said anode and said porous membrane to the outside of said housing, an exhausted catholyte conduit extending from between said cathode and said housing to the outside of said housing, an air inlet in said housing between said anode and said porous membrane, a brine inlet in said housing between said porous membrane and said anode, and a hydrogen outlet conduit extending from between said porous membrane and said cathode to the outside of said housing.

* * * * *